United States Patent
Sato

(10) Patent No.: US 7,590,206 B2
(45) Date of Patent: Sep. 15, 2009

(54) EQUALIZATION APPARATUS AND EQUALIZATION METHOD

(75) Inventor: Hiroaki Sato, Kanagawa (JP)

(73) Assignee: Panasonic Corporation, Osaka (JP)

( * ) Notice: Subject to any disclaimer, the term of this patent is extended or adjusted under 35 U.S.C. 154(b) by 625 days.

(21) Appl. No.: 11/397,896

(22) Filed: Apr. 5, 2006

(65) Prior Publication Data

US 2006/0233230 A1    Oct. 19, 2006

(30) Foreign Application Priority Data

Apr. 6, 2005    (JP)    ............... 2005-109639

(51) Int. Cl.
  *H04B 1/10*    (2006.01)
  *H04L 27/06*    (2006.01)
(52) U.S. Cl. ...................... 375/350; 375/341
(58) Field of Classification Search ................ 375/229, 375/232, 262, 340, 341, 350
  See application file for complete search history.

(56) References Cited

U.S. PATENT DOCUMENTS

| 5,598,434 | A | 1/1997 | Kaku et al. |
| 5,644,603 | A | 7/1997 | Ushirokawa |
| 5,867,531 | A | 2/1999 | Shiino et al. |
| 6,373,888 | B1 * | 4/2002 | Lindoff ............... 375/231 |
| 6,504,868 | B1 * | 1/2003 | Koizumi ............... 375/341 |
| 2007/0086550 | A1 * | 4/2007 | Kaise ............... 375/350 |

FOREIGN PATENT DOCUMENTS

| JP | 08023282 | 1/1996 |
| JP | 8172382 | 7/1996 |
| JP | 8307283 | 11/1996 |

* cited by examiner

*Primary Examiner*—Betsy L Deppe
(74) *Attorney, Agent, or Firm*—Dickinson Wright, PLLC

(57) ABSTRACT

An equalization apparatus and method estimate a channel response based on a received signal and a reference signal. Equalization processing estimates intersymbol interference with the received signal based on a channel response estimation results. A decoding error is detected based on the equalization processing to provide an error detection result. A power level threshold for the channel response estimation result is controlled based on the channel response estimation result of the received signal and the error detection result. The number of states for the equalization processing is determined, the number of taps employed in the equalization process is determined, and the number of taps used when the channel response is estimated is determined.

7 Claims, 4 Drawing Sheets

OPERATION OF POWER LEVEL THRESHOLD WHEN
CHANNEL CONDITION IS DETERMINED TO BE POOR

OPERATION OF POWER LEVEL THRESHOLD WHEN
CHANNEL CONDITION IS DETERMINED TO BE GOOD

EQUALIZATION APPARATUS AND EQUALIZATION METHOD

BACKGROUND OF THE INVENTION

1. Field of the Invention

The present invention relates to an equalization apparatus such as maximum likelihood sequence estimator (MLSE) and the like for use in mobile communication terminals, and an equalization method.

2. Description of the Related Art

Conventionally, in mobile communication, multipath is formed by reflection, diffraction and scattering by buildings, producing multiplex signal interference and multipath fading where the amplitude and phase of received signals fluctuate when a mobile communication terminal moves. In addition, when differences in the time of arrival due to propagation delay are not negligible, intersymbol interference occurs where a preceding symbol interferes with a succeeding symbol. Hence, an equalization apparatus is needed to minimize influences of intersymbol interference included in the received signal and accurately estimate the transmission symbol sequence.

In mobile communication of recent years, the equalization apparatus is indispensable with increase in transmission speed. However, power consumption of the equalization apparatus upon signal reception is substantial, which greatly influences talk time and standby time of mobile communication terminals powered by a dry cell or battery, and results in a technical problem of difficulty of long time use. So far, a low power consumption method improving this point is proposed in document 1 (Japanese Patent Application Laid-Open No. HEI8-23282).

FIG. 6 is a block diagram showing a schematic configuration of an equalization apparatus of a mobile communication terminal disclosed in document 1. The equalization apparatus shown in this figure has: received signal storage section 200 that stores received signals; channel response estimator 201 that estimates a channel response; control circuit 202 that controls the number of states employed in maximum likelihood sequence estimation; and a Viterbi equalizer 203 whereby the number of states is variable, and sets a power level threshold for channel response values, makes channel responses greater than the threshold valid, and determines the number of states based on the result, thereby reducing the amount of equalization processing.

However, with the conventional mobile communication terminal, an equalization apparatus sets a power level threshold for channel response values, searches for a response having the largest delay and larger power level than the threshold, makes responses up to that response valid and determines the number of states in an equalizer. Thus, although low power consumption is achieved by reducing the operation amount of equalization processing, there is a problem that the power level threshold cannot be adaptively updated in accordance with radio channel conditions.

In addition, since the power level threshold does not follow radio channel conditions, optimization of the number of states and consequent equalization processing is not carried out. There is therefore a problem that low power consumption is not achieved adequately.

Furthermore, since the power level threshold does not follow the radio communication channel, an error in a decision value after equalization processing may occur. There is therefore a problem that reception performance may be degraded.

SUMMARY OF THE INVENTION

It is therefore an object of the present invention to provide an equalization apparatus and equalization method whereby sufficient low power consumption can be achieved and degradation in reception performance can be minimized.

According to an aspect of the invention, the equalization apparatus of the present invention having: a received signal storage section that stores a received signal; a channel response estimation section that estimates a channel response based on the received signal and a reference signal; an equalization section that carries out equalization processing for eliminating intersymbol interference with the received signal based on a channel response estimation result; an error detection section that detects a decoding error based on the equalization processing; and a control section that controls a power level threshold for the channel response estimation result based on the channel response estimation result of the received signal and an error detection result, determines the number of states in the equalization section and the channel response estimation section, and determines the number of taps in the equalization section and the channel response estimation section based on the number of states.

According to another aspect of the invention, an equalization method of the present invention includes the steps of: estimating a channel response based on a received signal and a reference signal; carrying out equalization processing for eliminating intersymbol interference with the received signal based on a channel response estimation result; detecting a decoding error based on the equalization processing; controlling a power level threshold for the channel response estimation result based on the channel response estimation result of the received signal and an error detection result; determining the number of states for the equalization processing; and determining the number of taps employed in the equalization processing and the number of taps used when the channel response is estimated.

BRIEF DESCRIPTION OF THE DRAWINGS

The above and other objects and features of the invention will appear more fully hereinafter from a consideration of the following description taken in connection with the accompanying drawings, in which.

DESCRIPTION OF THE PREFERRED EMBODIMENT

Now, a preferred embodiment of the present invention will be described below in detail with reference to the accompanying drawings.

Figure 1:
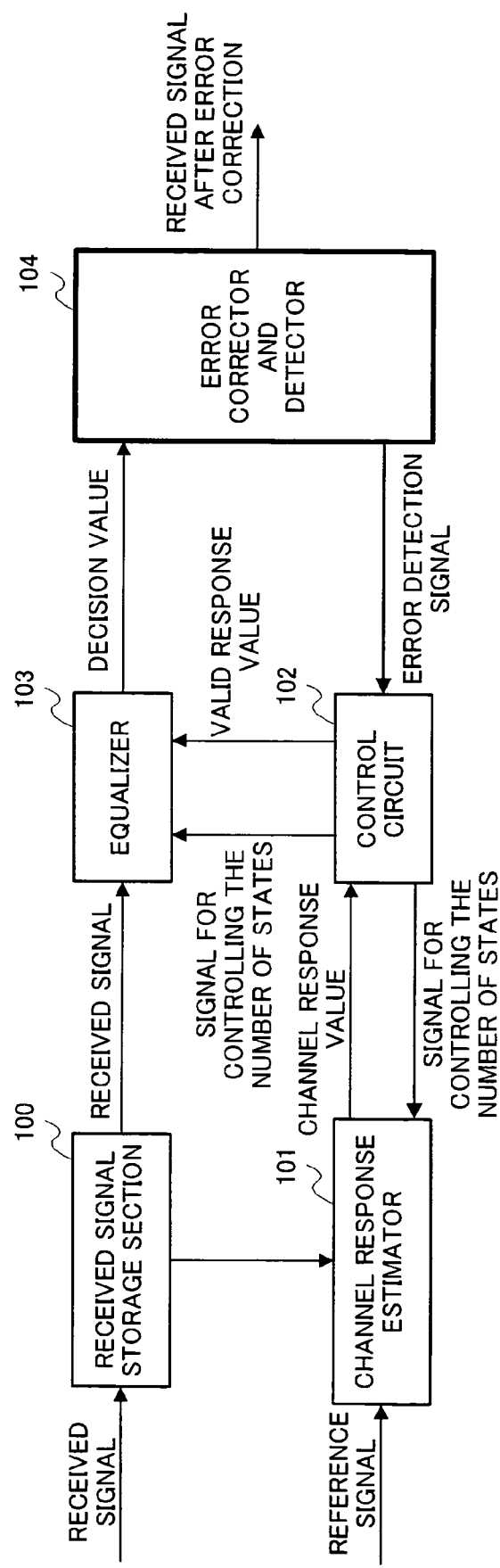
FIG. 1 is a block diagram showing a schematic configuration of an equalization apparatus according to an embodiment of the present invention.

FIG. 1 is a block diagram showing a schematic configuration according to an embodiment of the present invention.

In this figure, the equalization apparatus of the present embodiment has: a received signal storage section 100 that stores a received signal; channel response estimator 101, provided as a channel response estimation means that, estimates a channel response from a reference signal and the received signal; equalizer 103, provided as an equalization means, that selects the number of taps necessary for equalization processing in accordance with the number of trellis states designated, and performs maximum likelihood sequence estimation for signal distortion cancellation based on a trellis diagram; error corrector and detector 104, provided as an error detection means, that detects an error from a soft decision value on which equalization processing is carried out in equalizer 103; and control circuit 102, provided as a controlling means, that detects a channel response having the largest delay and larger power than a power level threshold among channel responses calculated in channel response estimator 101, makes responses up to that channel response having the largest delay valid, determines the number of trellis states and controls the power level threshold from an error detection result from error corrector and detector 104.

In received signal storage 100, received signals are stored over the length of one burst. A burst signal is formed with a plurality of slots, each slot having a configuration including a signal known to both the transmission side and the reception side, in addition to a data signal. A received signal relating to the position of the reference signal (or referred to as a "training signal") in the burst is inputted in channel response estimator 101 from received signal storage 100. With reference to the reference signal, channel response estimator 101 calculates a channel response from the received signal. The number of channel responses calculated then is K, a number in accordance with the maximum amount of delay of a multiplex signal in a very poor communication environment.

Next, the operation of the above-described equalization apparatus will be described.

First, the received signal is stored in received signal storage section 100 and then distributed to channel response estimator 101 and equalizer 103. With reference to the reference signal, channel response estimator 101 calculates a channel response from the received signal and inputs the result in control circuit 102. As explained above, the number of channel responses calculated then is "K."

Figure 3:
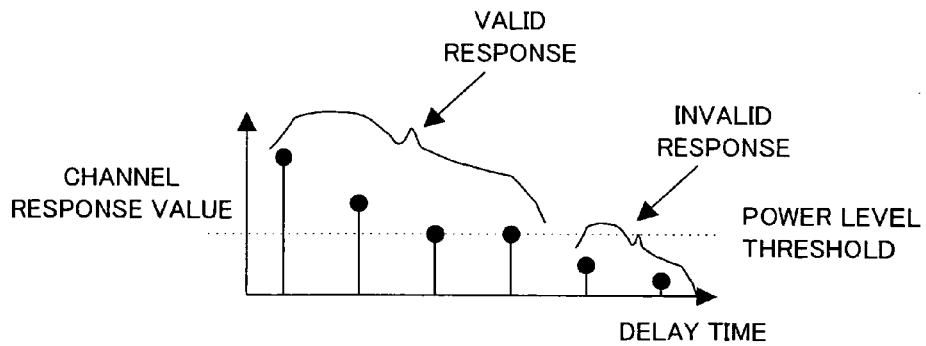
FIG. 3 is a graph explaining an example of channel response and a power level threshold according to the equalization apparatus of the embodiment.

Control circuit 102 searches for a response having the largest delay and larger power than a predetermined threshold value among K channel responses calculated in channel response estimator 101. In other words, as shown in FIG. 3, control circuit 102 detects the channel response having the largest delay and larger power than a power level threshold, makes channel responses up to that Lth channel response ($L \leq K$) valid channel responses, determines the number of trellis states $M^{(L-1)}$ (where M is the M-ary number of the modulation signal), and inputs the result in equalizer 103.

Equalizer 103 selects the number of taps necessary for equalization processing according to the number of states $M^{(L-1)}$ determined in control circuit 102 and carries out maximum likelihood sequence estimation based on a trellis diagram.

Here, the conventional art has difficulty adaptively controlling this power level threshold in accordance with changes in channel responses.

The present embodiment provides a configuration for feeding back an error detection signal representing an error detection result in error corrector and detector 104, in order to control the power level threshold for channel response estimation results. Error corrector and detector 104 performs error correction and error detection from the soft decision value, which is output from equalizer 103 as a result of equalization processing of the received signal, and feeds back the error detection signal to control circuit 102.

Control circuit 102 has a counter (not shown) that counts the number of error-free received bursts based on the error detection signal from error corrector and detector 104, counting up every burst based on the error detection signal. Control circuit 102 controls the above-described power level threshold based on the error detection signal fed back from error corrector and detector 104 and the count of error-free received bursts.

Next, power level threshold control in control circuit 102 based on channel response estimation results and the number of trellis states in equalization apparatus 103 will be described below.

In controlling the power level threshold and the number of trellis states in equalizer 103, the following three cases (1) to (3) are possible:

(1) A received burst is determined to be an error in error corrector and detector 104;

(2) The number of received bursts with no error detected exceeds a certain count; and (3) Neither (1) nor (2) applies.

The operation of control circuit 102 in the above three possible cases will be described below with reference to the flow chart shown in FIG. 2 and the graphs shown in FIGS. 3 to 5.

Figure 2:
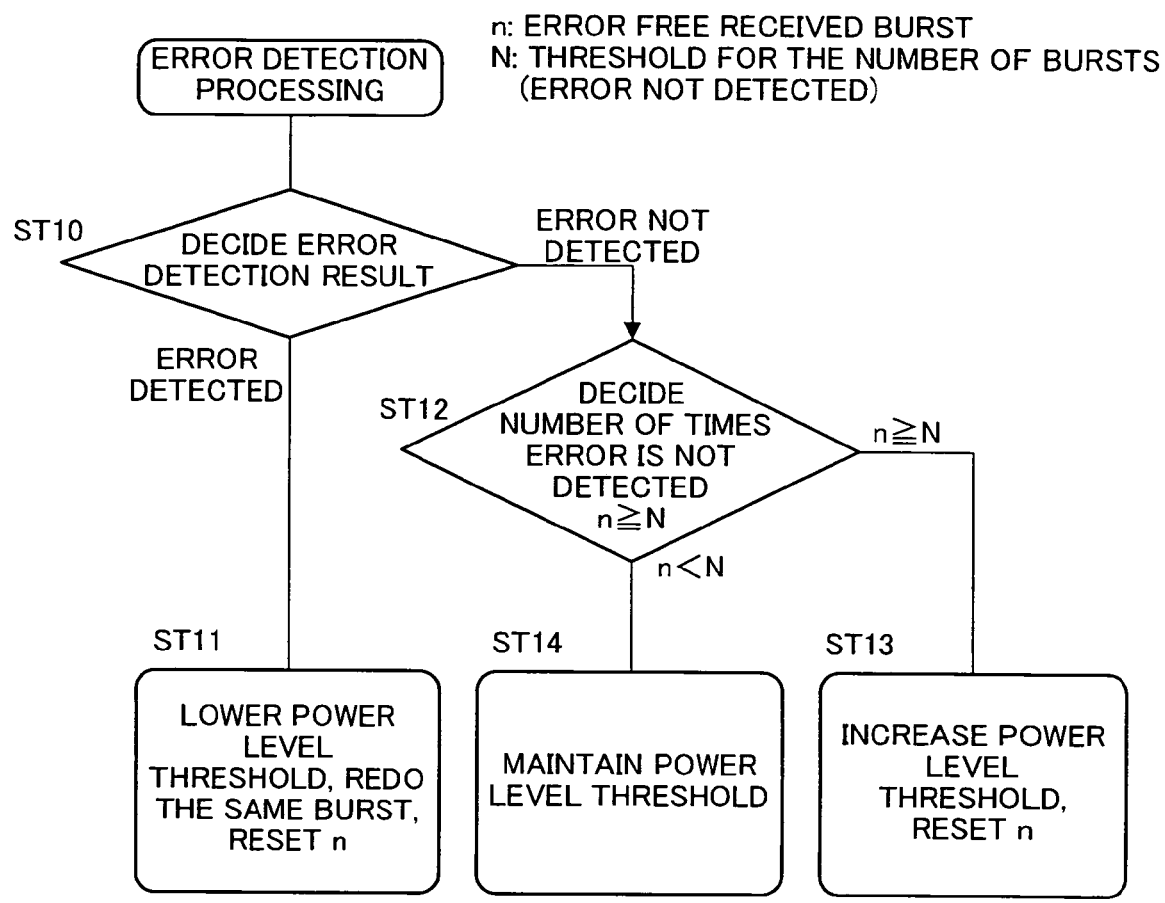
FIG. 2 is a flow chart explaining a threshold control method for a channel response estimator according to the equalization apparatus of the embodiment.

FIG. 2 is a flow chart explaining the threshold control method of the present embodiment. Also, FIG. 3 is a graph showing an example of a channel response and power level threshold. FIG. 4 is a graph showing an example of a power level threshold when channel condition is poor. FIG. 5 is a graph showing an example of a power level threshold when channel condition is good.

First, the above case (1) will be described where "a received burst is determined to be an error in error corrector and detector 104."

This (1) refers to the case where a received burst is determined to have an error by error corrector and detector 104—that is, the case where channel condition is determined to be poor in step ST10 in FIG. 2, represented as "ERROR DETECTED." In this case, compared to the previous burst period, channel condition may be worse and the number of trellis states in equalizer 103 is inadequate. Therefore, it is necessary to increase the number of trellis states in equalizer 103, and the power level threshold is controlled as follows.

Figure 4:
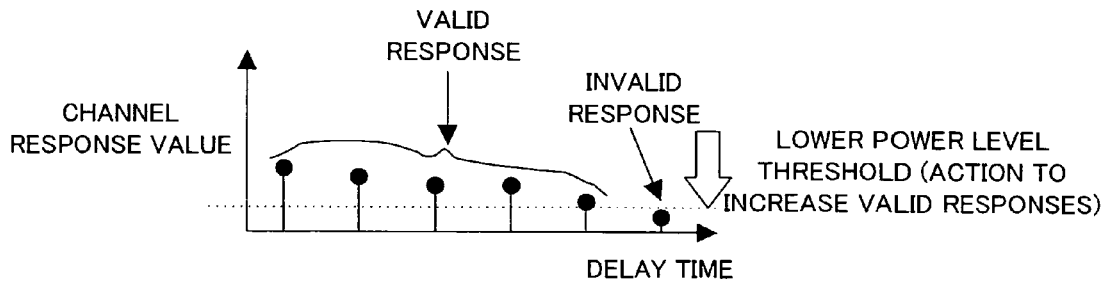
FIG. 4 is a graph explaining an example of a power level threshold according to the equalization apparatus of the embodiment when channel condition is poor.

FIG. 4 illustrates the operation of the power level threshold in the above case (1) where channel condition is determined to be poor. When an error detection signal is output from error corrector and detector 104, the power level threshold for channel responses is lowered. That is, action is taken to increase the number of valid responses. After the power level threshold has been changed, the counter in control circuit 102 is reset (step ST11) in order to bring the number of error-free received bursts n back to the original state and redo the same bursts. By lowering the power level threshold, it becomes possible to increase the number of trellis states employed in equalizer 103, and therefore equalization processing can be carried out with responses of long delays, which are previously considered invalid. By this means, it becomes possible to improve the accuracy of equalization processing.

Next, the above case (2) will be described where "the number of received bursts with no error detected exceeds a certain count."

This (2) refers to the case where a received burst is determined to be error-free in error corrector and detector 104—that is, the case where channel condition is determined to be good instep ST10 in FIG. 2, represented as "ERROR NOT DETECTED." In this case, $n \geq N$—that is, the number of received bursts n with no error detected is equal to or greater than the threshold N for received bursts, which is a certain count. It is here assumed that, compared to the previous burst period, the channel condition is good and the number of trellis states in equalizer 103 has been able to follow adequately. Therefore, it is necessary to reduce the number of trellis states in equalizer 103, and the power level threshold is controlled as follows.

Figure 5:
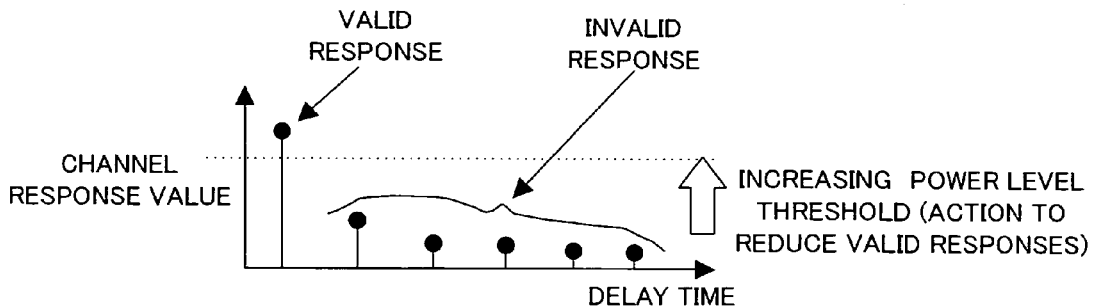
FIG. 5 is a graph explaining an example of a power level threshold according to the equalization apparatus of the embodiment when channel condition is good.
Figure 6:
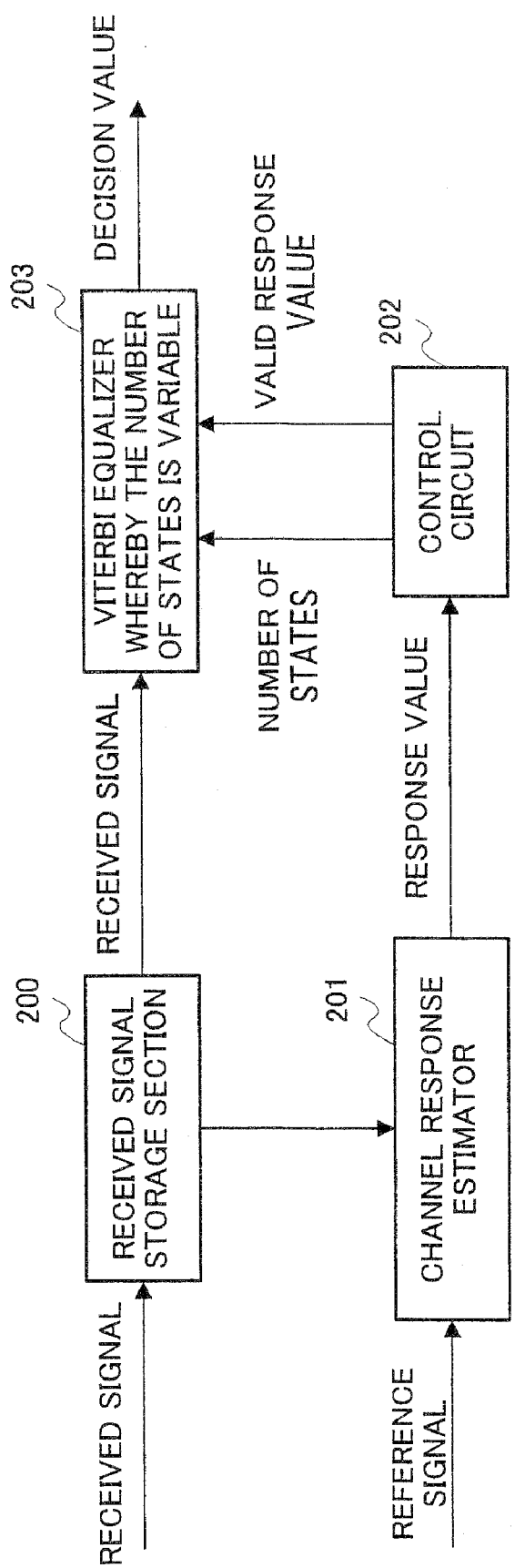
FIG. 6 is a block diagram showing a schematic configuration of a conventional maximum likelihood sequence estimator whereby the number of states is variable, compatible with the equalization apparatus according to the embodiment.

FIG. 5 illustrates the operation of the power level threshold in the case (2) where channel condition is determined to be good. When the number of received bursts for which no error detection signal is output from error corrector and detector 104 becomes equal to or greater than the threshold N, that is, when $n \geq N$ in step ST12 in FIG. 2, the reception environment is determined to be good, and the power level threshold is increased. After the power level threshold has been changed, the counter in control circuit 102 is reset so as to bring the number of error-free received bursts n back to the original state (step ST13). By increasing the power level, it becomes possible to reduce the number of trellis states employed in equalizer 103, and thus equalization processing can be optimized in accordance with the reception environment.

Next, the above case (3) will be described where "neither above (1) nor (2) applies."

This case (3)—that is, any case where above (1) or (2) does not apply—refers to the case where error is not detected over a certain number of bursts based on error detection results, and the case where n<N is determined in step ST12 in FIG. 2. In this case, the power level threshold for channel response is maintained (step ST14).

In addition, control circuit 102 outputs a signal for controlling the number of states to channel response estimator 101 and controls the number of taps in channel response estimator 101 in the same way as the control method for equalizer 103. In other words, channel response estimator 101 selects the number of taps according to the number of trellis states decided in control circuit 102. By this means, the operation load in channel response estimation can be reduced.

In this way, according to the equalization apparatus of the present embodiment, it is possible to control a power level threshold to be adaptively updated based on an error detection result in error corrector and detector 104, determine the number of trellis states necessary for equalization processing based on the threshold, and control the number of taps employed in equalization processing and, in the same way, control the number of taps in channel response estimator 101, thereby achieving lower power consumption than heretofore and minimizing degradation in reception performance.

In addition, the power level threshold that is set for channel responses is updated adaptively in accordance with radio channel conditions, so that the number of trellis states and consequent equalization processing can be optimized, thereby achieving lower power consumption than heretofore and minimizing degradation in reception performance even when changes occur in the reception environment.

Furthermore, when an error detection result in error corrector and detector 104 indicates that decoding error is detected, the power level threshold is lowered and the count value of received bursts is reset, so that the number of trellis states employed in equalizer 103 can be increased by lowering the power level threshold, equalization processing can be carried out with responses of long delays, which are previously considered invalid, and thus, the accuracy of equalization processing can be improved.

Moreover, when an error detection result in error corrector and detector 104 indicates that decoding error is not detected and the number of error-free received bursts counted exceeds a predetermined value, the power level threshold is increased and the count value of the received bursts is reset. On the other hand, when the error detection result indicates that decoding error is not detected and the number of the received bursts is less than a predetermined value, the power level threshold is maintained. Thus, the number of trellis states employed in equalizer 103 can be reduced by increasing the power level threshold and equalization processing can be optimized in accordance with the reception environment.

Furthermore, channel response estimator 101 determines the number of taps necessary for channel response processing in accordance with the number of trellis states decided in control circuit 102, so that the operation load in channel response estimation can be reduced.

As described above, according to the present invention, it is possible to reduce power consumption than conventional equalization apparatus and minimize degradation in reception performance even when changes occur in the reception environment.

The equalization apparatus of the present invention employs a configuration having: a received signal storage section that stores a received signal; a channel response estimation section that estimates a channel response based on the received signal and a reference signal; an equalization section that carries out equalization processing for eliminating intersymbol interference with the received signal based on a channel response estimation result; an error detection section that detects a decoding error based on the equalization processing; and a control section that controls a power level threshold for the channel response estimation result based on the channel response estimation result of the received signal and an error detection result, determines the number of states in the equalization section and the channel response estimation section, and determines the number of taps in the equalization section and the channel response estimation section based on the number of states.

Also, the equalization method of the present invention includes the steps of: estimating a channel response based on a received signal and a reference signal; carrying out equalization processing for eliminating intersymbol interference with the received signal based on a channel response estimation result; detecting a decoding error based on the equalization processing; controlling a power level threshold for the channel response estimation result based on the channel response estimation result of the received signal and an error detection result; determining the number of states for the equalization processing; and determining the number of taps employed in the equalization processing and the number of taps used when the channel response is estimated.

Therefore, the equalization apparatus and equalization method of the present invention provide advantages of minimizing degradation in reception performance even when changes occur in the reception environment and reducing power consumption more than conventional equalization apparatus and methods. Thus, the equalization apparatus and equalization method of the present invention are suitable for use with mobile communication terminals (mobile phones and PDAs (Personal Digital Assistants)) in mobile communication systems.

The present invention is not limited to the above described embodiments, and various variations and modifications may be possible without departing from the scope of the present invention.

This application is based on Japanese Patent Application No. 2005-109639, filed on Apr. 6, 2005, the entire content of which is expressly incorporated by reference herein.

What is claimed is:

1. An equalization apparatus comprising:
  a received signal storage section that stores a received signal;
  a channel response estimation section that estimates a channel response based on the received signal and a reference signal;
  an equalization section that carries out equalization processing for eliminating intersymbol interference with the received signal, wherein the equalization processing is based on a channel response estimation result;
  an error detection section that detects a decoding error based on the equalization processing to provide an error detection result; and
  a control section that controls a power level threshold for the channel response estimation result based on the channel response estimation result of the received signal and the error detection result, determines a number of states in the equalization section and the channel response estimation section, and determines a number of taps in the equalization section and the channel response estimation section based on the number of states.

2. The equalization apparatus according to claim 1, wherein the control section counts a the number of received bursts with no error detected in a decoding result, based on the error detection result, and determines the decoding result per received burst.

3. The equalization apparatus according to claim 2, wherein, when the error detection result indicates a decoding error, the control section reduces the power level threshold for the channel response estimation result and resets a count value of the received bursts.

4. The equalization apparatus according to claim 2, wherein, when the number of the received bursts is less than a predetermined value, the control section maintains the power level threshold for the channel response estimation result.

5. The equalization apparatus according to claim 2, wherein, when the number of the received bursts is greater than a predetermined value, the control section increases the power level threshold for the channel response estimation result and resets a count value of the number of the received bursts with no error detected in the decoding result on a counter.

6. The equalization apparatus according to claim 2, wherein, based on the power level threshold for the channel response estimation result, the control section determines the number of states using responses up to a response having the largest delay and having larger power than the power level threshold as valid responses.

7. An equalization method comprising the steps of:
  estimating a channel response based on a received signal and a reference signal;
  carrying out equalization processing for eliminating intersymbol interference with the received signal, wherein the equalization processing is based on a channel response estimation result;
  detecting a decoding error based on the equalization processing to provide an error detection result;
  controlling a power level threshold for the channel response estimation result based on the channel response estimation result of the received signal and the error detection result;
  determining a number of states for the equalization processing; and
  determining a number of taps employed in the equalization processing and a number of taps used when the channel response is estimated.

* * * * *